United States Patent [19]

Dennington

[11] 4,139,515

[45] Feb. 13, 1979

[54] ANTI-FOULING PAINT CONTAINING A COPOLYMER OF A TRIORGANOTIN SALT OF AN UNSATURATED CARBOXYLIC ACID

[75] Inventor: Simon P. J. Dennington, Whitley Bay, England

[73] Assignee: The International Paint Co. Ltd., London, England

[21] Appl. No.: 849,098

[22] Filed: Nov. 7, 1977

[30] Foreign Application Priority Data

Nov. 16, 1976 [GB] United Kingdom ............... 47679/76

[51] Int. Cl.$^2$ ............................................. C08L 33/02
[52] U.S. Cl. ........................ 260/29.6 MM; 106/15.05
[58] Field of Search ............. 260/29.6 MM; 106/15 R

[56] References Cited

U.S. PATENT DOCUMENTS

| | | | |
|---|---|---|---|
| 3,167,473 | 1/1965 | Leebvick .................................. | 106/5 |
| 3,979,354 | 9/1976 | Dykman et al. .................... | 106/15 R |
| 4,021,392 | 5/1977 | Milne et al. ......................... | 106/15 R |
| 4,052,354 | 10/1977 | Beiter et al. ................ | 260/29.6 MM |

FOREIGN PATENT DOCUMENTS

| | | | |
|---|---|---|---|
| 1062324 | 3/1967 | United Kingdom ........................ | 106/5 |
| 1124297 | 8/1968 | United Kingdom ........................ | 106/5 |
| 1457590 | 12/1976 | United Kingdom .................. | 106/15 R |

OTHER PUBLICATIONS

"Takata LLL Antifouling", Brochure, Nippon Oils & Fats Co., Ltd, 13 pages, Sep. 1970.

*Primary Examiner*—M. J. Welsh
*Attorney, Agent, or Firm*—Davis, Hoxie, Faithfull & Hapgood

[57] ABSTRACT

An anti-fouling paint for ships' hulls comprises an aqueous emulsion of a film-forming emulsion copolymer and a substantially water-insoluble metalliferous pigment capable of reacting with seawater to form a water-soluble metal compound. The compound contains units of at least one triorganotin salt of an olefinically unsaturated carboxylic acid and units of at least one olefinically unsaturated comonomer selected so that the copolymer has a glass transition temperature of less than 30° C.

The paint has the remarkable property that relatively moving seawater smooths the surface of the paint.

13 Claims, No Drawings

ANTI-FOULING PAINT CONTAINING A COPOLYMER OF A TRIORGANOTIN SALT OF AN UNSATURATED CARBOXYLIC ACID

This invention is concerned with an antifouling paint for application to ships' hulls.

The growth of marine organisms on the submarine parts of a ship's hull increases the frictional resistance of the hull to passage through water, leading to increased fuel consumption and/or a reduction in the speed of the ship. Marine growths accumulate so rapidly that the remedy of cleaning and repainting as required in drydock is too expensive to contemplate. The alternative, which has been practised with increasing efficiency over the years, is to limit the extent of fouling by applying to the hull a top coat paint incorporating antifouling agents. The antifouling agents are biocides which are freed from the surface of the paint over a period in concentrations lethal to marine organisms at the hull surface. The antifouling paint fails only when the concentration of biocide available at the paint surface falls below the lethal concentration, and with modern paints up to two years of useful life is expected.

The better antifouling paints are thus effective in delaying the gross infestation of hulls for considerable periods, but a top coat paint on a ship's submarine surface has irregularities from its method of application and is furthermore subject to breakdown and delamination during service, increasing the roughness of the hull so that the performance of the ship falls off, even when fouling is prevented. A new ship with a freshly painted hull usually has a roughness between 75 $\mu$ and 125 $\mu$, the roughness being the average height of peaks above troughs in the film as measured by the method employed by the British Ship Research Association. During the service life of a ship the roughness may increase to 500 $\mu$ to 750 $\mu$ due to the onset of corrosion and deficiencies in the hull maintenance and painting process. When the roughness increases from 75 $\mu$ to 125 $\mu$ initially to 750 $\mu$ an increased shaft horse power of 40 percent is required to maintain the same speed.

Put another way, the speed of an initially smooth-hulled ship may be reduced from 15 knots to 13.5 knots at the same shaft horse power as the hull acquires a roughness of 750 $\mu$. The speed loss due to fouling and hull roughness was the subject of a paper by Mr. I. E. Telfer entitled "Some aspects of the external maintenance of tankers" given at the joint meeting of the Royal Institution of Naval Architects and the Ordem dos Engenheiros in Lisbon, Portugal in October 1971. His results are reproduced in graphical form in FIG. 1 of our copending British application 14723/74 (Ser. No. 1,457,590).

British patent application No. 14723/74 (Ser. No. 1,475,590) describes and claims an antifouling paint composition which functions to give a fouling-free surface. A film of the paint applied as a top coat to a ship's hull has the remarkable property that it at least preserves its surface smoothness in relatively moving seawater and generally improves it, so that the paint film becomes smoother during the ordinary traffic of the ship, leading to improve efficiency during service. The antifouling paint composition is based on a film-forming copolymer containing from more than 50 up to 80 percent by weight of units of at least one triorganotin salt of an olefinically unsaturated carboxylic acid, the balance of the copolymer being units of at least one olefinically unsaturated comonomer. Such a copolymer becomes soluble in seawater when depleted of its triorganotin content by ion exchange with the seawater. The paint composition of British patent specification No. 1,457,590 uses as pigment a substantially water-insoluble metalliferous pigment capable of reacting with seawater to form a water-soluble metal compound. It also includes as an ingredient a specified minimum amount of a hydrophobic organic retarder having certain specified properties for retarding the rate of dissolution of the paint film in relatively moving seawater.

The anti-fouling paint of British patent specification No. 1,457,590 is generally applied to the ship from a volatile organic solvent such as xylene. While such a solvent-based paint is suitable for many applications there is also a demand for a water-based paint having some self-smoothing properties as the paint described in British patent specification No. 1,457,590.

According to the present invention an anti-fouling paint for ships' hulls comprises (a) an aqueous emulsion of a film-forming emulsion copolymer containing from more than 50 up to 80 percent by weight of units of at least one triorganotin salt of an olefinically unsaturated carboxylic acid, the balance of the copolymer being units of at least one olefinically unsaturated comonomer, and the glass transition temperature of the copolymer being less than 30° C. and (b) a substantially water-insoluble metalliferous pigment capable of reacting with seawater to form a water-soluble metal compound.

The triorganotin salt of the olefinically unsaturated carboxylic acid incorporated in the copolymer suitably has the general formula

$$R_3SnOOCCR' = CHR''$$

where the three groups R are the same or different alkyl radicals containing up to 8 carbon atoms or aryl or aralkyl radicals, R' is H or methyl and R" is H or —COOSnR$_3$, where R is as defined above. Thus the cation of the salt, R$_3$Sn$^+$, is exemplified by tributyl tin, tripropyl tin, triethyl tin, tribenzyl tin, diethylbutyl tin, diethylamyl tin, diamylmethyl tin, triphenyl tin, tribromophenyl tin, diphenyltolyl tin, tritolyl tin, diethyl phenyl tin, ethyl diphenyl tin, octyldiphenyl tin and diethyloctyl tin. The preferred cations are those having three identical organic groups attached to the tin atom. The anion of the salt, —OOCCR' = CHR", may be, for example, acrylate, methacrylate, maleate or fumarate. Examples of the salt come from pairing any listed anion with any listed cation.

The copolymer also contains units of at least one other ethylenically unsaturated comonomer. The comonomer or comonomers must be chosen so that the copolymer has a glass transition temperature of less than 30° C. and preferably a glass transition temperature of 5°–25° C. Glass transition temperatures of 10° C. and 15° C. and intervening figures may be mentioned for example. The glass transition temperature of the copolymer is desirably slightly lower, say up to 8° C. lower, than the temperature at which the paint is to be applied, although when a paint is to be applied at Arctic temperatures a coalescing solvent can be used. The coalescing solvent, for example hexamethylene glycol, is water soluble and is a solvent for the copolymer. It plasticises the copolymer as the paint film is forming but is gradually washed from the film, allowing it to harden. The coalescing solvent, if used, is preferably used at amounts of 1–10% by volume of the total paint composition. The copolymer preferably incorporates units of a monomer which when homopolymerised has a glass transition temperature below 0° C. For example, any alkyl acrylate ester used as comonomer tends to reduce the glass transition temperature of the copolymer, acrylate esters with alcohols having 3 or more carbon atoms such as butyl acrylate, hexyl acrylate, propyl acrylate and amyl acrylate being the most effective in reducing the glass transition temperature. When these acrylate esters with alcohols having 3 or more carbon atoms are used a further ethylenically unsaturated comonomer is usually included in the copolymer, for example methyl methacrylate, acrylonitrile, methacrylonitrile, acrylamide, methacrylamide, vinyl acetate, vinyl chloride, styrene, α-methyl styrene, or vinyl pyridine. Further examples of comonomers which when homopolymerised have a glass transition temperature below 25° C. are methacrylate esters with alcohols having 4 or more carbon atoms and styrene derivatives substituted by alkyl chains of 4 or more carbon atoms, but the alkyl acrylates are preferred.

The most preferred copolymers comprise a terpolymer of tripropyl tin or tributyl tin acrylate or methacrylate, an alkyl acrylate having 3 to 6 carbon atoms in the alkyl group and methyl methacrylate.

The copolymer emulsion is prepared by emulsion polymerisation, preferably using an anionic or non-ionic surfactant. A polymerisation initiator such as a persulphate is generally used. Suitable anionic surfactants include long chain sulphonates and sulphates, preferably those having 10 to 18 carbon atoms such as sodium lauryl sulphonate. Suitable non-ionic surfactants include condensates of ethylene oxide with a fatty alcohol or an alkyl phenol, for example an ethylene oxide nonyl phenol condensate.

The substantially water-insoluble pigment capable of reacting with seawater is exemplified by zinc oxide, which is preferred, cuprous thiocyanate, cuprous oxide and zinc chromate. These pigments produce water-soluble metal compounds on reaction with seawater so that the pigment particles do not survive at the paint surface. The pigment has the effect of controlling the overall smoothing which the relatively-moving seawater exerts on the paint film, minimising localised erosion and preferentially removing excrescences formed during application of the paint.

The proportion of pigment to copolymer in the paint is preferably such as to give a pigment volume concentration of at least 25 percent but less than the critical pigment volume concentration, for example 25–50 percent, in the dry paint film. The critical pigment volume concentration is the maximum pigment volume concentration at which the film forming material wets all the pigment particles and is usually 50–55 percent for the copolymers and pigments specified above.

The combination of a copolymer as defined in (a) above and a seawater reactive pigment is an effective anti-fouling and self-smoothing paint. Its rate of dissolution in relatively-moving seawater is usually slower than that of a non-emulsion paint, since the copolymers prepared by emulsion polymerisation generally have a higher molecular weight than copolymers prepared for example by bulk polymerisation. The inherent viscosity of the emulsion copolymers is generally in the range 0.5–1.5, for example about 1, whereas the inherent viscosity of copolymers formed by polymerising the same monomers in solution is only 0.1–0.2.

The rate of dissolution of the paint film can be retarded if desired by incorporating a hydrophobic organic retarder in the paint, particularly when the copolymer contains a high proportion, for example above 65 percent by weight, of triorganotin salt units. The retarder can be a hydrophobic organic compound which has a solubility in seawater at 25° C. of not more than 5 parts per million by weight, is miscible with the copolymer (a) and has a negligible vapour pressure at 25° C. Examples of such hydrophobic organic retarders are silicone fluids, for example, methyl phenyl silicone fluid DC550 sold by Dow Corning Ltd., chlorinated diphenyl, for example Aroclor 1254 sold by Monsanto Ltd., chlorinated paraffin wax, for example Cereclor 48 sold by I.C.I. Ltd., and low-molecular weight polybutenes such as Hyvis 05 sold by B.P. Ltd. The hydrophobic organic retarder, if used, preferably comprises 5–50 percent by weight of the triorganotin ion content of the paint. The hydrophobic organic retarder should be emulsified into the paint composition.

As an alternative to using a hydrophobic organic retarder the paint composition can contain a water-insoluble pigment which does not react with, or dissolve in, seawater, as well as a seawater reactive pigment. Examples of such unreactive and insoluble pigments are titanium dioxide and ferric oxide. The unreactive pigment, if used, preferably forms from 5–40 percent by weight of the total pigment component of the paint. Some colouring pigments such as carbon black and phthalocyanine green are also insoluble and unreactive with seawater. These colouring pigments are generally used in amounts of less than 4 percent by weight of the total pigment. They are included in the insoluble and reactive pigment when calculating the proportion that this forms of the total pigment component. Other insoluble materials often used in marine paint compositions are silica and clays such as bentonite, which are used to control the flow and settling properties of the paint. These materials used to control the flow and settling properties are not regarded as pigments and are not included when calculating the proportions of the seawater reactive and unreactive pigments.

The slower rate of dissolution of the emulsion copolymers means that copolymers of higher organotin content, for example 70 percent by weight and above, can be used economically if a hydrophobic organic compound or an unreactive and insoluble pigment is used as retarder. The anti-fouling performance of the paint depends on the rate at which triorganotin ions are released into the seawater. This rate is proportional to the organotin content of the copolymer and the rate of dissolution of the paint film. Using an emulsion copolymer according to the invention, a copolymer of higher organotin content can be used to form a paint which is smoothed away more slowly by seawater compared to a paint having the same anti-fouling performance but a lower molecular weight copolymer. The emulsion copolymer can thus give a longer-lasting anti-fouling effect than even the known self-smoothing paints of British patent specification No. 1,457,590.

The paint composition can contain an additional biocide for example triphenyl tin fluoride or hydroxide, to augment the anti-fouling effect of the triorganotin ions released from the copolymer.

The invention is illustrated by the following Examples:

EXAMPLE 1

138.8g tributyl tin oxide were reacted with 40.1g methacrylic acid to form tributyl tin methacrylate. This was then copolymerised with 72.8g methyl methacrylate and 43.7g butyl acrylate. The monomers were emulsified in 295g added water using 7.5g sodium lauryl sulphate as the emulsifying agent. 1.5g potassium persulphate were used as polymerisation initiator. Polymerisation was carried out at 80° C. for one hour. Initially the reaction vessel had to be cooled but subsequently it was placed in an 80° C. water bath. A very stable polymer emulsion was formed in which the tributyl tin methacrylate content of the copolymer was 60% by weight. The inherent viscosity was 0.64 dl/g measured at 0.5% weight/volume in chloroform. The glass transition temperature of the copolymer was about 15° C.

A zinc oxide pigment premix was made by grinding the following ingredients in a ball mill.

|  | Grams |
| --- | --- |
| Zinc Oxide | 1173.6 |
| Water | 550.0 |
| Sodium hexametaphosphate | 20.0 |
| Non-ionic surfactant (a nonyl phenol ethylene oxide condensate) | 40.0 |
| Aerosil colloidal silica | 10.0 |
| Antifoaming agent | 8.0 |
| Sodium carboxymethyl cellulose dispersion (containing 2.5 g sodium carboxylic cellulose) | 45.5 |

The viscosity of the zinc oxide premix was 6.4 poise. 205 g of the copolymer emulsion was added to 500 g of the zinc oxide premix with rapid stirring to give an emulsion paint which was quite stable and could be readily applied by brushing or spraying. When applied to a ship's hull over a suitable undercoat such as pink primer for wood or Latenac epoxy resin or Vitar chlorinated rubber for metal and allowed to dry, the emulsion paint was resistant to static seawater and exhibited anti-fouling and self-smoothing properties in relatively-moving seawater.

EXAMPLE 2

The copolymer emulsion was prepared by the method described in Example 1 from the following ingredients:

|  | Grams |
| --- | --- |
| Tributyl tin oxide | 161.9 |
| Methacrylic acid | 46.7 |
| Methyl methacrylate | 58.2 |
| Butyl acrylate | 29.1 |
| Water | 295.0 |
| Sodium lauryl sulphate | 7.5 |
| Potassium persulphate | 1.5 |

A very stable polymer emulsion was formed. The tributyl tin methacrylate content of the copolymer was 70% by weight, the inherent viscosity was 0.55 dl/g measured at 0.5% weight/volume in chloroform, and the glass transition temperature was about 15° C.

10 g of silicone fluid DC550, a methyl phenyl silicone fluid sold by Dow Corning Ltd., was stirred into the polymer emulsion.

The copolymer emulsion containing silicone fluid was combined with the zinc oxide pigment premix described in Example 1 in the proportion of 41 parts of copolymer emulsion per 100 parts zinc oxide premix.

The paint formed was a stable emulsion paint. When applied to a ship's hull it had anti-fouling and self-smoothing properties. The rate of smoothing away of the paint film was not so rapid as the rate of smoothing of a paint film omitting the silicone fluid but otherwise identical.

EXAMPLE 3

A cuprous oxide pigment premix was made by grinding the following ingredients in a ball mill.

|  | Grams |
| --- | --- |
| Cuprous oxide | 1058 |
| Water | 400 |
| Sodium hexametaphosphate | 10 |
| 25% aqueous solution of "Orotan 731" non-ionic surfactant | 40 |
| 5% aqueous dispersion of hydroxypropyl methyl cellulose | 50 |
| Antifoaming agent | 1 |

205 g of the copolymer emulsion of Example 1 was added to 500 g of the cuprous oxide premix with rapid stirring to give a stable emulsion paint which could be readily applied by brushing or spraying. The paint exhibited anti-fouling and self-smoothing properties in relatively moving seawater.

EXAMPLE 4

A cuprous thiocyanate pigment premix was made by grinding the following ingredients in a ball mill.

|  | Grams |
| --- | --- |
| Cuprous thiocyanate | 521 |
| Water | 400 |
| Sodium hexametaphosphate | 10 |
| Surfactant solution as used in Example 3 | 40 |
| 5% aqueous dispersion of hydroxypropyl methyl cellulose | 50 |
| Antifoaming agent | 1 |

205 g of the copolymer emulsion of Example 1 was added to 330 g of the cuprous thiocyanate premix with rapid stirring to give a stable emulsion paint which could be readily applied by brushing or spraying. The paint exhibited anti-fouling and self-smoothing properties in relatively moving seawater.

What is claimed is:

1. An anti-fouling paint for ships' hulls comprising (a) an aqueous emulsion of a film-forming emulsion copolymer containing from more than 50 up to 80 percent by weight of units of at least one triorganotin salt of an olefinically unsaturated carboxylic acid, the balance of the copolymer being units of at least one olefinically unsaturated comonomer, the glass transition temperature of the copolymer being less than 30° C. and the inherent viscosity of the copolymer being from 0.5 to 1.5, and (b) a substantially water-insoluble metalliferous pigment capable of reacting with seawater to form a water-soluble metal compound.

2. An anti-fouling paint according to claim 1 in which the emulsion copolymer (a) includes units of a monomer which when homopolymerised has a glass transition temperature below 0° C.

3. An anti-fouling paint according to claim 1 in which the emulsion copolymer (a) has a glass transition temperature of 5°–25° C.

4. An anti-fouling paint according to claim 1 in which the emulsion copolymer (a) is a terpolymer of tripropyl tin or tributyl tin acrylate or methacrylate, an alkyl acrylate having 3–6 carbon atoms in the alkyl group and methyl methacrylate.

5. An anti-fouling paint according to claim 1 which additionally contains a water-soluble coalescing solvent for the emulsion copolymer (a).

6. An anti-fouling paint according to claim 1 having a pigment volume concentration of 25–50 per cent.

7. An anti-fouling paint according to claim 1 in which the said pigment is zinc oxide.

8. An anti-fouling paint according to claim 1 containing a hydrophobic organic retarder which retarder is a hydrophobic organic compound which has a solubility in seawater at 25° C. of not more than 5 parts per million by weight, is miscible with the copolymer (a) and has a negligible vapour pressure at 25° C.

9. An anti-fouling paint according to claim 8 in which the hydrophobic organic retarder is a silicone fluid.

10. An anti-fouling paint according to claim 1 which contains a water-insoluble pigment which does not react with or dissolve in seawater.

11. An anti-fouling paint according to claim 10 in which the unreactive pigment forms 5–40 percent by weight of the total pigment component of the paint.

12. An anti-fouling paint according to claim 10 in which the unreactive pigment is titanium dioxide or ferric oxide.

13. A ship's hull provided with anti-fouling paint according to claim 1.

* * * * *